(12) United States Patent
Chang

(10) Patent No.: US 7,575,674 B2
(45) Date of Patent: Aug. 18, 2009

(54) ROTARY BAR SCREEN DEVICE

(75) Inventor: Myung Keun Chang, Seoul (KR)

(73) Assignee: KC Samyang Water Systems Co., Ltd., Seoul (KR)

( * ) Notice: Subject to any disclaimer, the term of this patent is extended or adjusted under 35 U.S.C. 154(b) by 300 days.

(21) Appl. No.: 11/620,728

(22) Filed: Jan. 8, 2007

(65) Prior Publication Data

US 2007/0163928 A1    Jul. 19, 2007

(30) Foreign Application Priority Data

Jan. 16, 2006    (KR) .................. 10-2006-0004515

(51) Int. Cl.
*E03F 5/14* (2006.01)
(52) U.S. Cl. .................. 210/158; 210/159; 210/160; 210/396
(58) Field of Classification Search .......... 210/158, 210/159, 160, 391, 396, 400
See application file for complete search history.

(56) References Cited

U.S. PATENT DOCUMENTS

| | | | | |
|---|---|---|---|---|
| 658,196 A | * | 9/1900 | Whitney | 210/158 |
| 1,910,860 A | * | 5/1933 | Sayers | 210/160 |
| 2,804,209 A | * | 8/1957 | Eastling et al. | 210/158 |
| 4,360,426 A | * | 11/1982 | Wetzel | 210/160 |
| 4,521,305 A | * | 6/1985 | Deal | 210/158 |
| 4,692,242 A | * | 9/1987 | Jackson | 210/160 |
| 5,800,701 A | * | 9/1998 | Larsen | 210/158 |
| 6,187,184 B1 | * | 2/2001 | Reetz et al. | 210/160 |
| 6,251,268 B1 | * | 6/2001 | Holmberg | 210/158 |
| 6,709,578 B2 | * | 3/2004 | Wilcher | 210/158 |
| 2005/0016908 A1 | * | 1/2005 | Kerl | 210/158 |
| 2005/0126967 A1 | * | 6/2005 | Berry et al. | 210/158 |

* cited by examiner

*Primary Examiner*—Christopher Upton
(74) *Attorney, Agent, or Firm*—patenttm.us

(57) ABSTRACT

Provided is a rotary bar screen device. The device includes a driving motor, an up/down pair of driving and driven sprockets, left and right transfer chains, a plurality of screen buckets, a removal unit, and a slide plate. The driving motor is provided over a support frame, and transmits a driving force. The driving and driven sprockets are driven by the driving force. The left and right transfer chains connect the driving and driven sprockets with each other while circulatively moving. The plurality of screen buckets are provided between the left and right transfer chains. The removal unit is provided between the left and right driving sprockets. The slide plate guides the foreign materials dropping from the screen buckets.

2 Claims, 9 Drawing Sheets

ROTARY BAR SCREEN DEVICE

BACKGROUND OF THE INVENTION

1. Field of the Invention

The present invention relates to a rotary bar screen device, and more particularly, to a rotary bar screen device with an increased effective area, for maximizing the effective area for passing seawater and simply and conveniently picking up and removing foreign materials such as floating matters from water.

2. Description of the Related Art

In general, a seawater refreshing plant or an electricity generating plant is equipped with a rotary bar screen device at its water intake port to filter a shellfish or an oceanic life and foreign materials such as various floating waste materials out of seawater because it takes and uses the seawater as a raw water or a cooling water of a cooling system.

FIG. 1 illustrates a conventional rotary bar screen device. As shown in FIG. 1, a support frame 10 is installed in a concrete structure of a water intake facility, and driving sprockets 30 are installed at both sides over the support frame 10, and driven sprockets 32 are installed at both sides under the water intake facility. The sprockets 30 and 32 connect with each other by a transfer chain 40, and the transfer chain 40 is equipped with a screen bucket 50.

The conventional rotary bar screen device operates in such a manner that the screen bucket 50 installed at the transfer chain 40 picks up various foreign materials from the water and elevates the foreign materials on its movement the moment the transfer chain 40 circulatively moves by activating the driving sprocket 30 using a driving source such as a motor 20, and the foreign materials fall down and are collected by the collection tub 80 as the screen bucket 50 turns over passing a top point of the driving sprocket 30.

However, the conventional rotary bar screen device is incliningly installed to more smoothly drop the foreign materials because the foreign materials are filtered by the screen bucket 50 and are broken away from the screen bucket 50 simply by a self-weight after being transferred to an upper part of the driving sprocket 30. Accordingly, the conventional rotary bar screen device has a drawback that it excessively occupies a space for installation in a water intake structure, and has a considerable difficulty in a maintenance work.

As shown in FIGS. 2 and 3, the screen bucket 50 is of a structure in which the bar block 55 is installed by a fixing bolt in a space between a pipe shaped upper bar 51 with a predetermined height and a channel shaped lower bar 52 horizontally with the direction in which the seawater flows. Therefore, the screen bucket 50 necessarily requires a separate bracket 57 for installing and fixing the bar block 55 between the upper and lower bars 51 and 52 between which the seawater is introduced. Accordingly, there is a drawback of sufficiently guaranteeing an introduction passage for passing the seawater. In other words, an effective height (h2) of a through-hole 54 for introducing the seawater is merely about 61% of a total height (h1) of the screen bucket 50.

SUMMARY OF THE INVENTION

Accordingly, the present invention is directed to a rotary bar screen device with an increased effective area that substantially overcomes one or more of the limitations and disadvantages of the conventional art.

One object of the present invention is to provide a rotary bar screen device with an increased effective area, for maximizing the effective area for passing seawater.

Another object of the present invention is to provide a rotary bar screen device with an increased effective area, for picking up and simply and conveniently removing foreign materials such as floating materials from water.

A further another object of the present invention is to provide a rotary bar screen device with an increased effective area, for minimizing a space for installation in a water intake structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a rotary bar screen device provided to a seawater intake port of a seawater refreshing equipment or an electricity generating equipment, and filtering foreign materials introduced together with seawater. The device includes a driving motor, an up/down pair of driving and driven sprockets, left and right transfer chains, a plurality of screen buckets, a removal unit, and a slide plate. The driving motor is provided over a support frame, and transmits a driving force. The up/down pair of driving and driven sprockets are provided at both left and right sides of the support frame, and are driven by the driving force received from the driving motor. The left and right transfer chains connect the driving and driven sprockets with each other while circulatively moving. The plurality of screen buckets are provided between the left and right transfer chains, and filter the foreign materials in the seawater and transfer the filtered foreign materials. The removal unit is provided between the left and right driving sprockets, and rotates with the driving sprocket at the same time and pushes the foreign materials out of the screen bucket. The slide plate guides the foreign materials dropping from the screen buckets.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
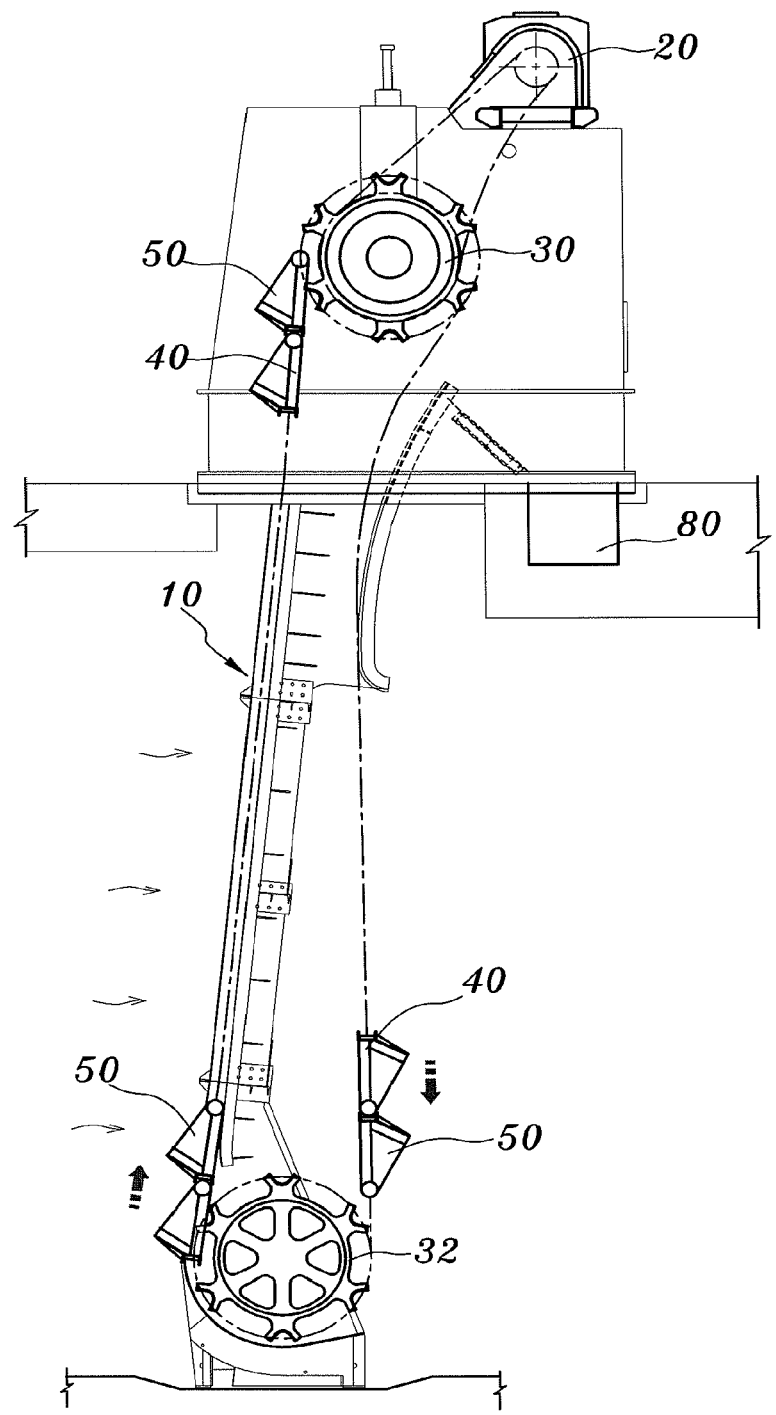
FIG. 1 is a side diagram illustrating a conventional rotary bar screen device.
Figure 2:
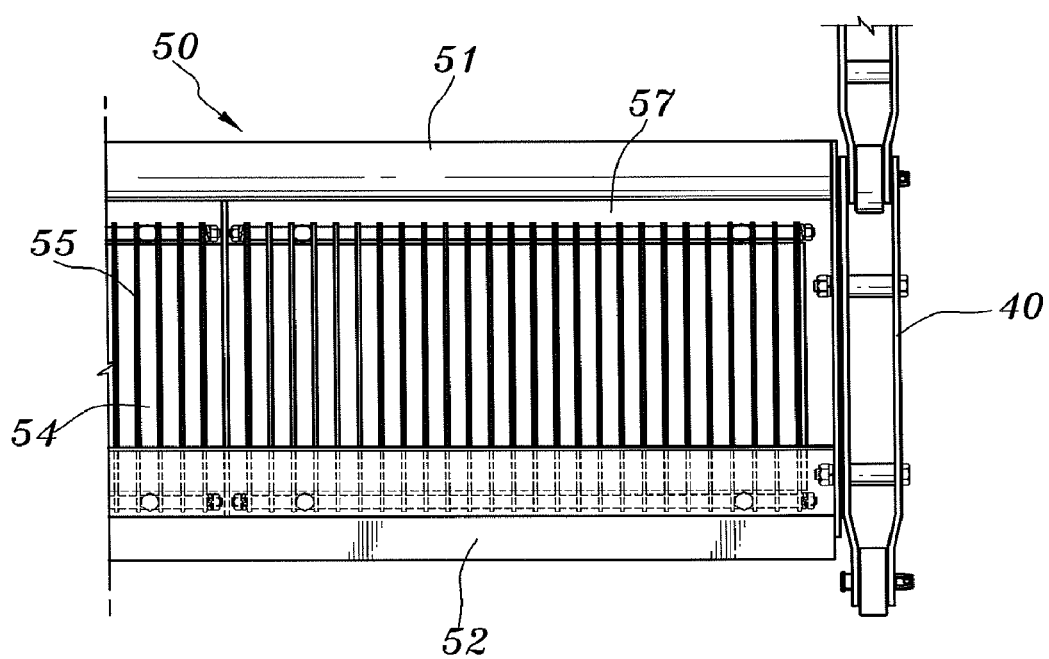
FIG. 2 is a front diagram illustrating a screen bucket of a conventional rotary bar screen device.
Figure 3:
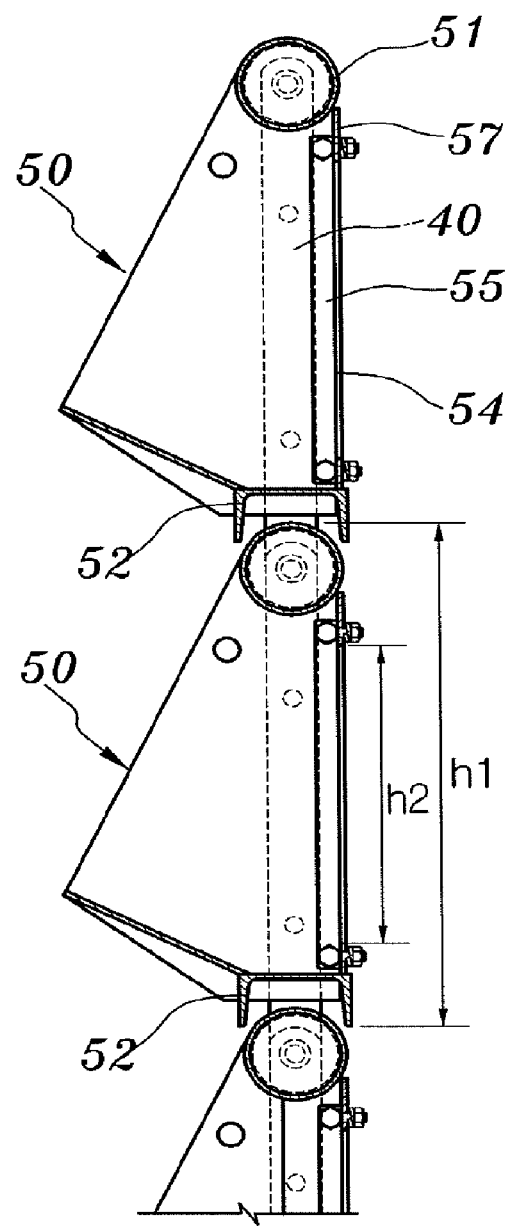
FIG. 3 is a side diagram illustrating the screen bucket of FIG. 3.

Reference will now be made in detail to the preferred embodiments of the present invention, examples of which are illustrated in the accompanying drawings. Wherever possible, the same reference numerals will be used throughout the drawings to refer to the same or like parts.

Figure 4:
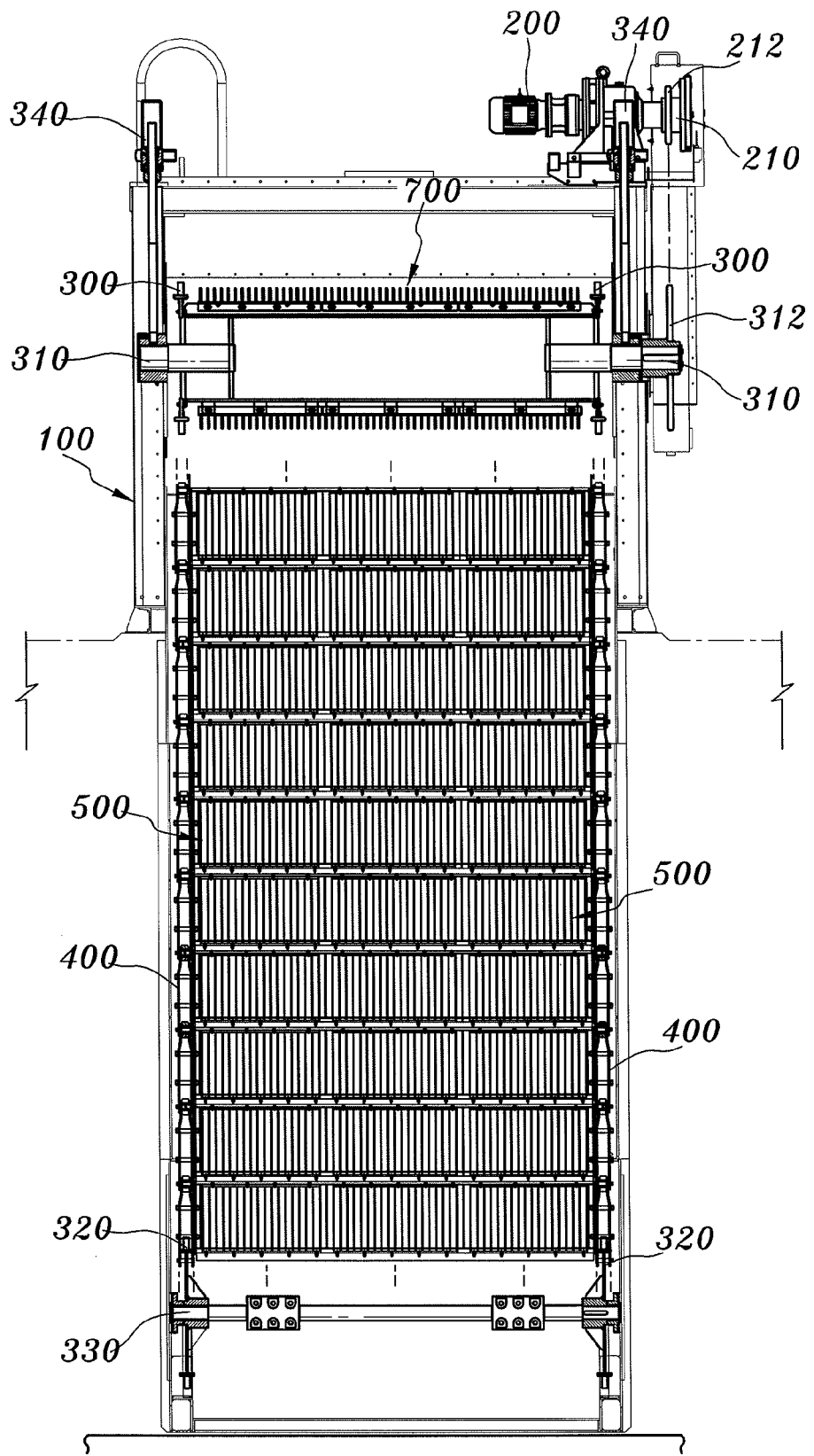
FIG. 4 is a front diagram illustrating a rotary bar screen device with an increased effective area according to the present invention.
Figure 5:
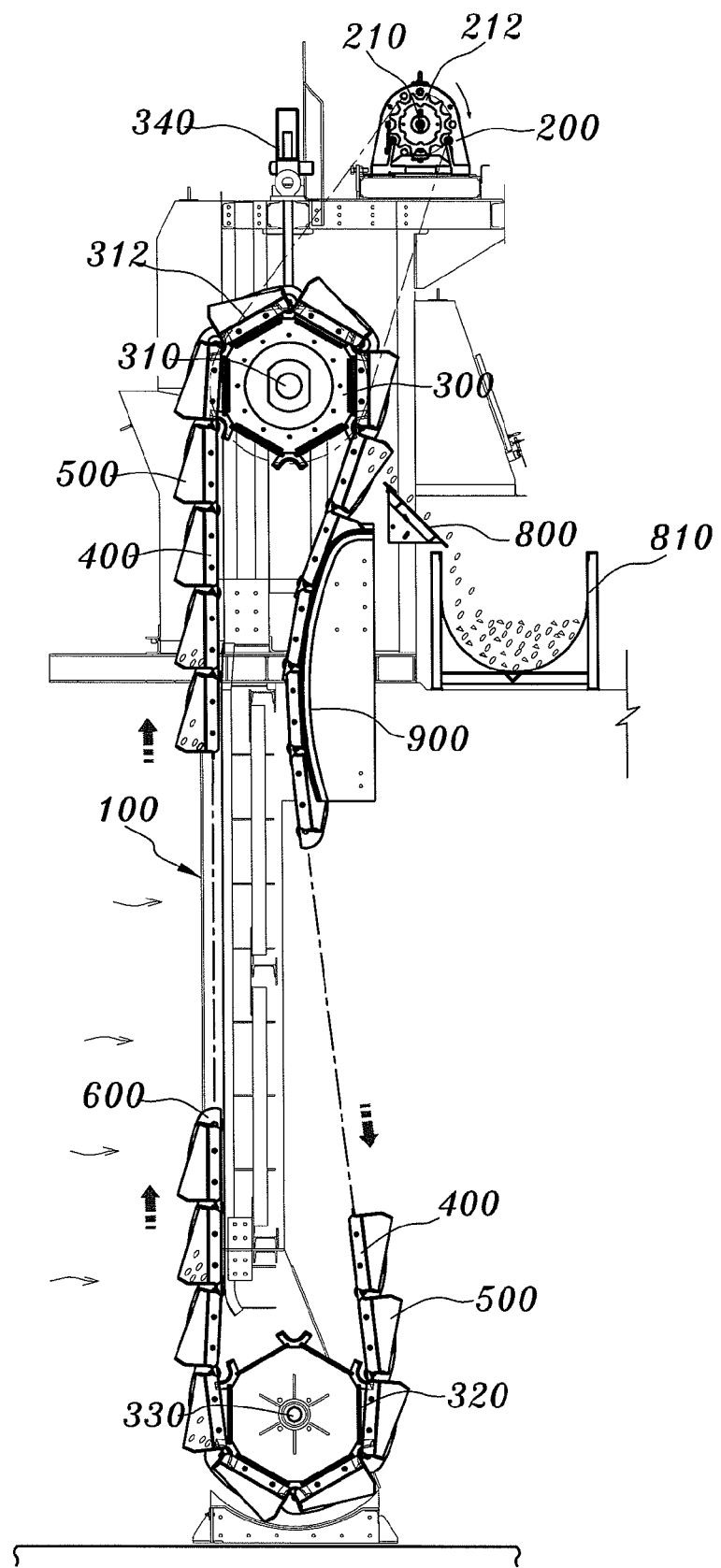
FIG. 5 is a side diagram illustrating the rotary bar screen device of FIG. 4.

FIG. 4 is a front diagram illustrating a rotary bar screen device with an increased effective area according to the present invention. FIG. 5 is a side diagram illustrating the rotary bar screen device of FIG. 4. As shown in FIGS. 4 and 5, the inventive rotary bar screen device includes a support frame 100, a driving motor 200, a transfer chain 400 connecting to driving and driven sprockets 300 and 320, a screen bucket 500, a seal plate 600, a removal unit 700, and a slide plate 810.

The driving motor 200 is fixedly installed at an upper end of the support frame 100, and transmits a driving force. The driving motor 200 is of a structure in which it can transmit a rotary force to the driving sprocket 300 by connecting a first sprocket 212 and a second sprocket 312 with each other by a chain, when the driving motor 200 is driven. The first sprocket 212 is combined to a motor shaft 210 of the driving motor 200. The second sprocket 312 is combined to a driving shaft 310 of the driving sprocket 300 provided at one side.

The driving and driven sprockets 300 and 320 circulatively move the transfer chain 400 by the driving force received from the driving motor 200. The driving and driven sprockets 300 and 320 each are installed up/down as a pair at both left and right sides at the driving shaft 310 and the driven shaft 330 that are combined by bearings with the support frame 100. A capstan 340 is installed over the driving sprocket 300 to control a tension of the transfer chain 400. The capstan 340 connects with the driving shaft 310.

Figure 6:
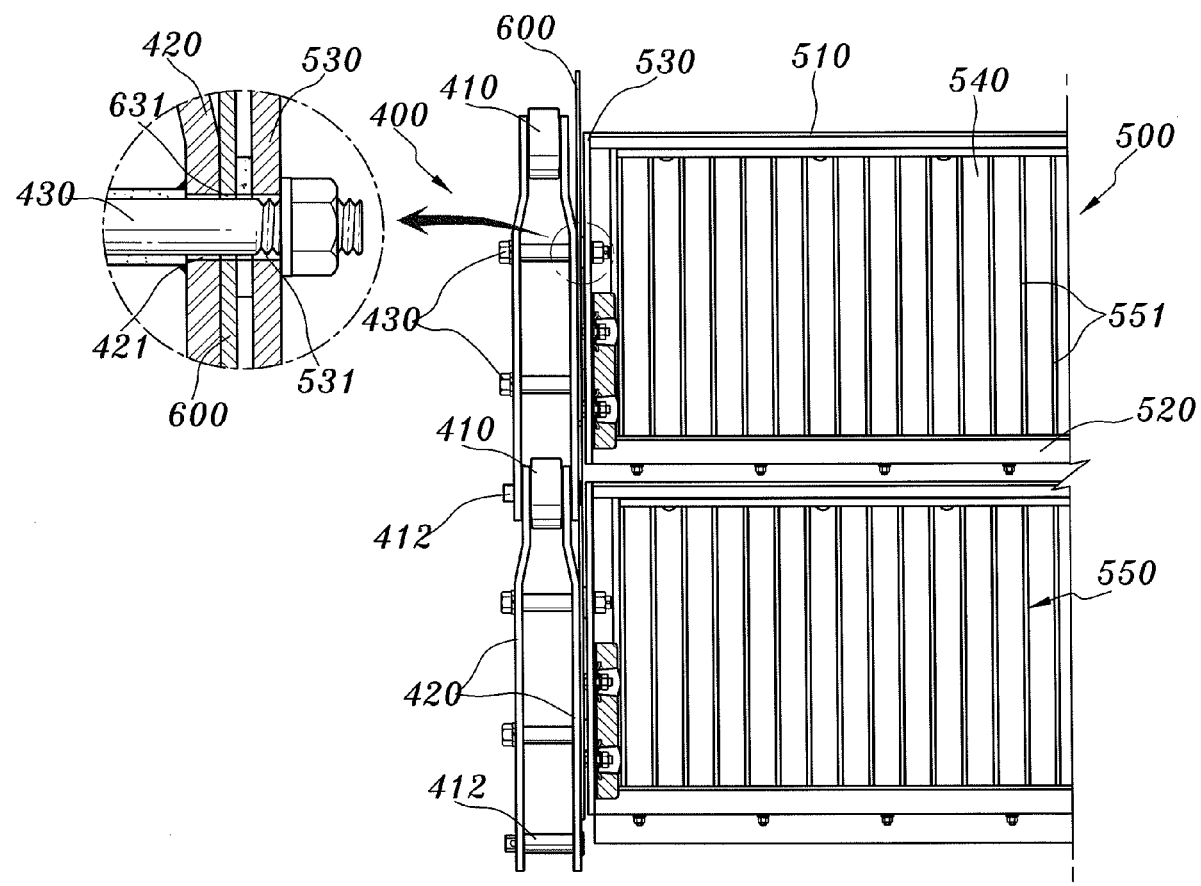
FIG. 6 is a front diagram illustrating a screen bucket according to the present invention.
Figure 7:
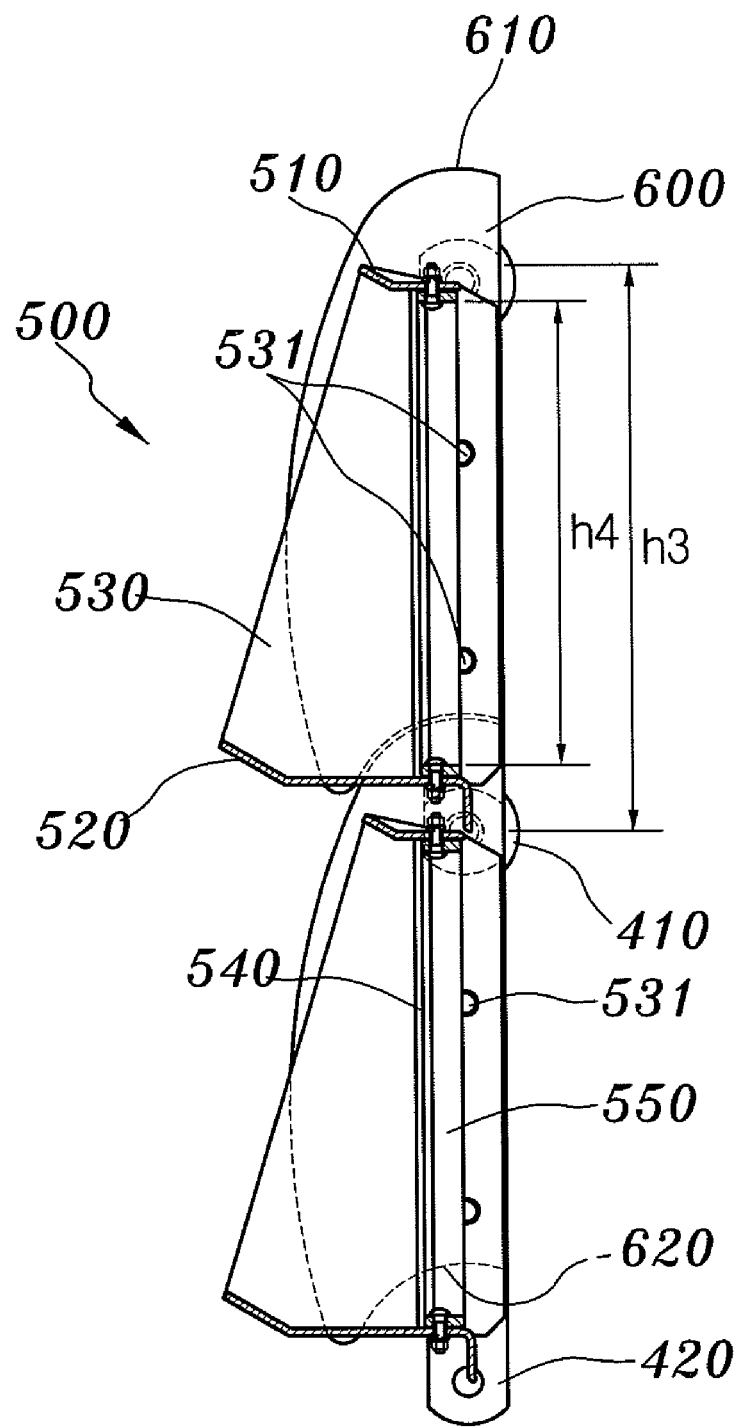
FIG. 7 is a side diagram illustrating the screen bucket of FIG. 6.

The transfer chain 400 elevates the screen bucket 500. As shown in FIGS. 6 and 7, rollers 410 are installed between both ends of link plates 420 provided at both sides, such that they can rotate using a bush. The rollers 410 use fixing pins 412 as rotary shafts. A plurality of combination holes 421 are provided on a side surface of the link plate 420, to enable a combination of a fixing member 430 for fixing the screen bucket 500.

A diameter of the roller 410 is provided greater than a gap between the link plates 420. The link plates 420 face each other, and are bent toward each other at their one-ends such that the gap gets narrow. Accordingly, the link plate 420 connects together with the roller 410 by the fixing pin 412 with an end of its narrow-gap part inserted to an end of a wide-gap part of another adjacent link plate 420.

The screen bucket 500 transfers foreign materials obtained by filtering seawater, to a collection tub 810. The screen bucket 500 includes an upper plate 510 and a lower plate 520 whose front ends each bend upward, and a side plate 530 provided at the upper and lower plates 510 and 520 and covering side surfaces of the upper and lower plates 510 and 520. A plurality of bar blocks 550 are installed in through-holes 540 for passing the seawater between the upper and lower plates 510 and 520. The plurality of bar blocks 550 include a plurality of parallel bars 551 that are fixed keeping a gap by a predetermined distance to filter the foreign materials such as floating materials.

The side plate 530 includes a plurality of combination holes 531 for passing a fixing member 430 for fixing the link plates 420 of the transfer chain 400. The screen bucket 500 and the transfer chain 400 are firmly connected with each other by inserting the fixing member 430 into the combination hole 531 and the connection hole 421 of the link plate 420 for combination.

The seal plate 600 prevents the foreign materials from passing along between both the transfer chain 400 and the screen bucket 500. The seal plate 600 includes a curve protrusion part 610 and a concave groove part 620 corresponding to the curve protrusion part 610 at its upper and lower ends, respectively, to keep airtightness by joint connection with another adjacent seal plate 600.

The seal plate 600 includes a plurality of through-holes 631 for passing the fixing member 430 for fixing the transfer chain 400 and the screen bucket 500, on its side surface. Accordingly, when the transfer chain 400 is combined with the screen bucket 500, the seal plate 600 is combined together by the fixing member 430, thereby sufficiently preventing the foreign materials from being introduced into a water intake port without passing through the screen bucket 500.

Figure 8:
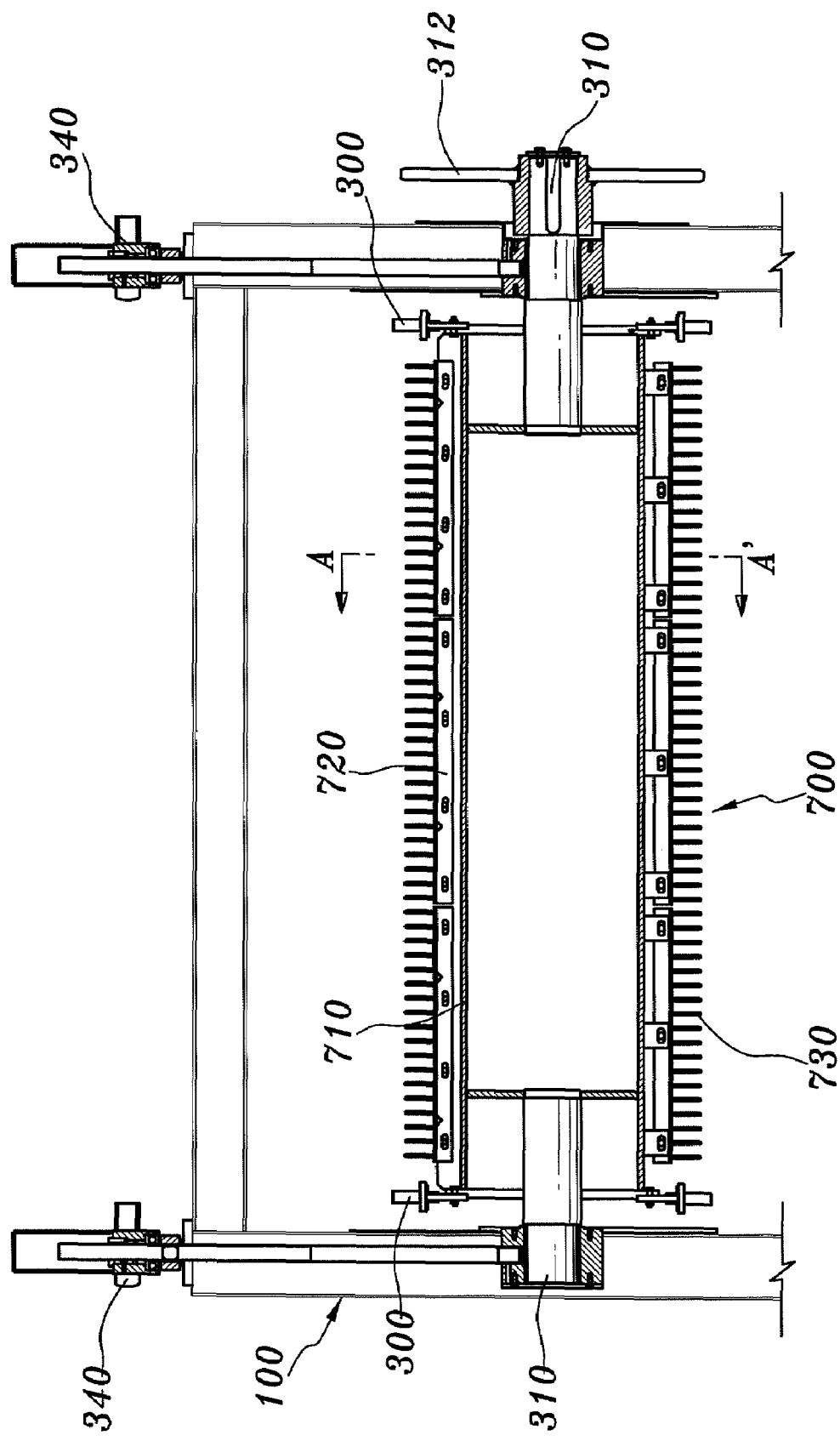
FIG. 8 is a front cross-sectional diagram illustrating a drum according to the present invention.
Figure 9:
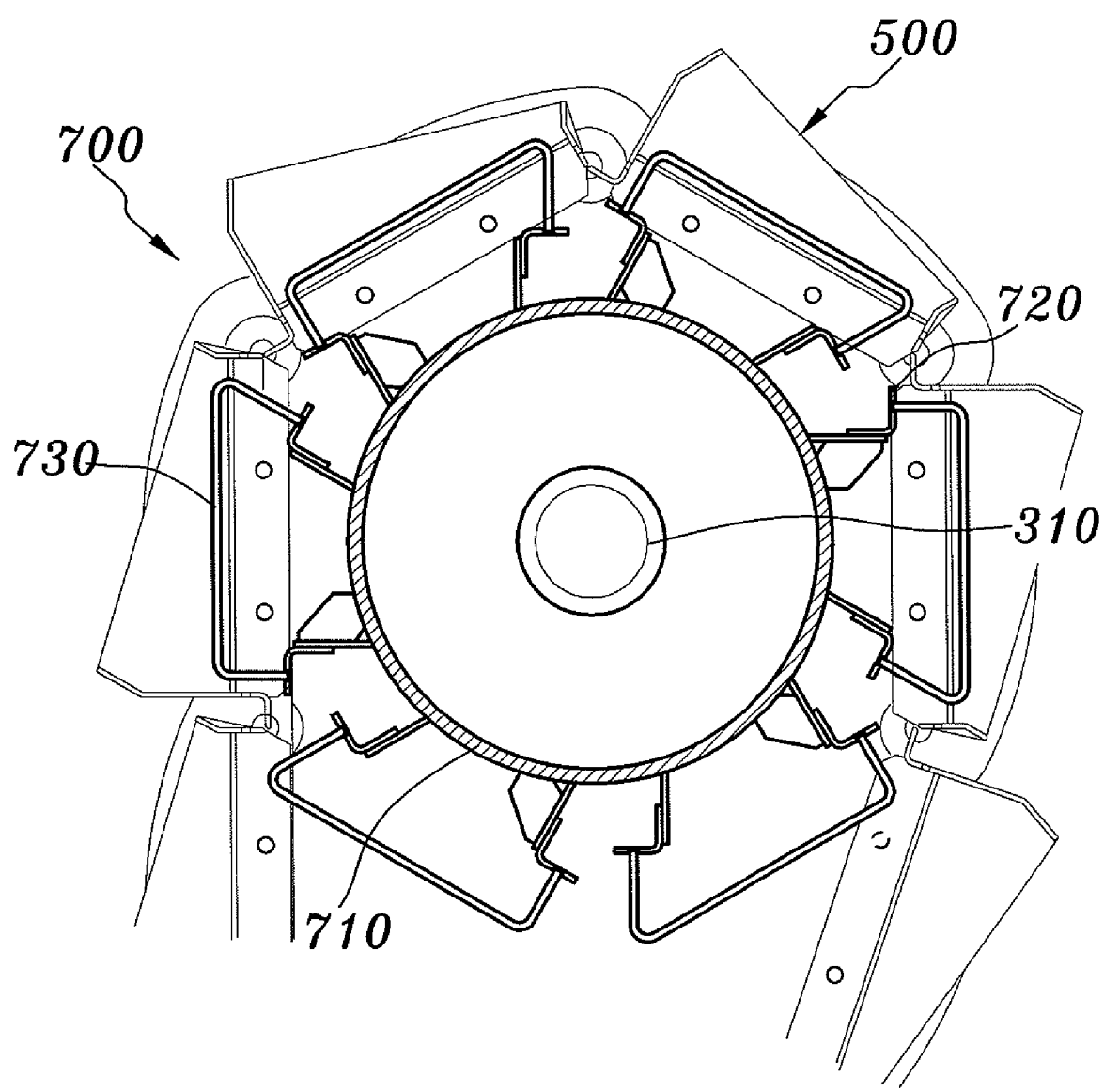
FIG. 9 is an enlarged cross-sectional diagram taken along line A-A' of FIG. 8.

The removal unit 700 pushes out the foreign materials that reach a top point of the driving sprocket 300 as put in the screen bucket 500. As shown in FIGS. 8 and 9, the removal unit 700 according to an exemplary embodiment of the present invention includes a drum 710 installed on the same axis as the driving sprocket 300; a plurality of fin brackets 720 radially provided around the drum 710; and a plurality of fin blocks 730 bent at both ends and fixed to the fin brackets 720. Accordingly, the fin blocks 730 simultaneously rotating with the driving sprocket 300 protrude through the gap of the screen bucket 500, thereby facilitating removal of the foreign materials.

The slide plate 800 guides the foreign materials dropping from the screen bucket 500. The slide plate 800 is provided in rear of the support frame 100 in which the screen bucket 500 moves down.

The collection tub 810 is provided under the slide plate 800. The collection tub 810 collects the foreign materials transferred through the screen bucket 500 and dropping along the slide plate 800.

An inclination guide 900 is provided between the collection tub 810 and the transfer chain 400 so that the screen bucket 500 can easily drop the foreign materials as inclining when moving down.

An operation of the above constructed screen device will be described as follows.

When a power source is applied to the driving motor 200, the driving sprocket 300 connecting to the driving motor 200 rotates clockwise while circulatively running the transfer chain 400. Accordingly, the screen bucket 500 fixed to the transfer chain 400 moves up in front and moves down in rear of a seawater inflow port, thereby filtering the foreign materials such as the floating materials from the seawater, and transferring the filtered foreign materials upward. Thus, only the filtered seawater is introduced into the water intake port.

When directing downward at a point where the screen bucket 500 moves down passing a top point on a running path of the driving sprocket 300, the upwardly transferred foreign materials fall to the collection tub 810 along the slide plate 800 by a self weight. The fin block 730 of the removal unit 700 is provided on the same driving shaft 310 of the driving sprocket 300 so that it can simultaneously rotate with the driving sprocket 300. As the fin block 730 protrudes through the gap between the bar blocks 550 of the screen bucket 500, it completely removes the stuck foreign materials from the screen bucket 500. Thus, when the screen bucket 500 moves down and is again sunk in water, the primarily filtered foreign materials are prevented from being again introduced into the water.

The seal plate 600 provided along between the screen bucket 500 and the transfer chain 400 prevents the foreign materials from being introduced into the water intake port without passing through the screen bucket 500, thereby greatly improving a filter performance. In other words, the seal plate 600 has the curve protrusion part 610 and the concave groove part 620 at its upper and lower ends, respectively, thereby always keeping airtight connection with another adjacent seal plate 600 without aperture even in a position where the screen bucket 500 is inflected.

As shown particularly in FIG. 7, the upper and lower plates 510 and 520 of the screen bucket 500 are manufactured by bending thin flat plates, thereby maximizing the effective area for passing the seawater. In other words, an effective height (h4) of the through-hole 540 for introducing the seawater can be improved about 80% or more of a total height (h3) of the screen bucket 500, thereby optimizing a water intake efficiency of the water intake structure.

As described above, the present invention has an effect of reducing a cost for production of the screen bucket and maximizing the effective area for passing the seawater because the upper and lower plates of the screen bucket are manufactured by bending the thin flat plates, and the bar blocks are assembled and combined by bolts at upper and lower parts of the upper and lower plates.

Also, the present invention has an effect of simply and conveniently removing the foreign materials from the screen bucket because the removal unit simultaneously rotating with the driving sprocket protrudes through the gap of the screen bucket while completely pushing the stuck foreign materials out of the screen bucket.

Also, the present invention has an effect of not only remarkably reducing the space for installation in the water intake structure but also facilitating the maintenance work because it can be installed vertically with the water intake structure.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A rotary bar screen device provided to a seawater intake port of a seawater refreshing equipment or an electricity generating equipment, and filtering foreign materials introduced together with seawater, the device comprising:
    a driving motor provided over a support frame, and transmitting a driving force;
    an up/down pair of driving and driven sprockets provided at both left and right sides of the support frame, and driven by the driving force received from the driving motor;
    left and right transfer chains connecting the driving and driven sprockets with each other while circulatively moving;
    a plurality of screen buckets provided between the left and right transfer chains, including upper and lower plates, a side plate and a plurality of bar blocks provided in through-holes between the upper and lower plates and filtering the foreign materials in the seawater and transferring the filtered foreign materials;
    a slide plate for guiding the foreign materials dropping from the screen buckets;
    an inclination guide provided between the transfer chain and the slide plate so that the screen bucket can easily drop the foreign materials as inclining when moving down;
    a collection tub provided under the slide plate to collect the foreign materials dropping from the screen bucket along the slide plate;
    capstans provided over the left and right driving sprockets and connected to a driving shaft of the driving sprocket to control tensions of the transfer chains;
    a removal unit provided between the left and right driving sprockets, mounted on the same axis of the driving sprocket to rotate with the driving sprocket at the same time and pushing the foreign materials out of the screen bucket,
    wherein the removal unit comprises a drum provided on the same axis as the driving sprocket, a plurality of fin brackets radially provided around the drum and a plurality of fin blocks whose both bent ends are fixed to the fin brackets, the upper and lower plates constituting the screen bucket are manufactured by bending thin flat plates, and the bar blocks provided in the through-holes between the upper and lower plates are assembled by fixing bolts.

2. A rotary bar screen device provided to a seawater intake port of a seawater refreshing equipment or an electricity generating equipment, and filtering foreign materials introduced together with seawater, the device comprising:
    a driving motor provided over a support frame, and transmitting a driving force;
    an up/down pair of driving and driven sprockets provided at both left and right sides of the support frame, and driven by the driving force received from the driving motor;
    left and right transfer chains connecting the driving and driven sprockets with each other while circulatively moving;
    a plurality of screen buckets provided between the left and right transfer chains, and filtering the foreign materials in the seawater and transferring the filtered foreign materials;
    a removal unit provided between the left and right driving sprockets, and rotating with the driving sprocket at the same time and pushing the foreign materials out of the screen bucket; and
    a slide plate for guiding the foreign materials dropping from the screen buckets,
    wherein the removal unit comprises:
    a drum provided on the same axis as the driving sprocket;
    a plurality of fin brackets radially provided around the drum; and
    a plurality of fin blocks fixed at both bent ends to the fin brackets.

* * * * *